United States Patent
Saito et al.

(10) Patent No.: US 11,770,034 B2
(45) Date of Patent: Sep. 26, 2023

(54) CORE FOR, ROTATING ELECTRICAL MACHINE

(71) Applicants: SUMITOMO ELECTRIC INDUSTRIES, LTD., Osaka (JP); SUMITOMO ELECTRIC SINTERED ALLOY, LTD., Okayama (JP)

(72) Inventors: Tatsuya Saito, Osaka (JP); Yuichi Nakamura, Osaka (JP); Tomoyuki Ueno, Osaka (JP); Hijiri Tsuruta, Okayama (JP); Shinichi Hirono, Okayama (JP)

(73) Assignees: SUMITOMO ELECTRIC INDUSTRIES, LTD., Osaka (JP); SUMITOMO ELECTRIC SINTERED ALLOY, LTD., Okayama (JP)

( * ) Notice: Subject to any disclaimer, the term of this patent is extended or adjusted under 35 U.S.C. 154(b) by 400 days.

(21) Appl. No.: 17/258,546

(22) PCT Filed: Jul. 11, 2019

(86) PCT No.: PCT/JP2019/027594
§ 371 (c)(1),
(2) Date: Jan. 7, 2021

(87) PCT Pub. No.: WO2020/022094
PCT Pub. Date: Jan. 30, 2020

(65) Prior Publication Data
US 2021/0167641 A1 Jun. 3, 2021

(30) Foreign Application Priority Data
Jul. 27, 2018 (JP) .................. 2018-141841

(51) Int. Cl.
*H02K 1/14* (2006.01)
*H02K 21/24* (2006.01)

(52) U.S. Cl.
CPC ............. *H02K 1/148* (2013.01); *H02K 21/24* (2013.01)

(58) Field of Classification Search
CPC ............ H02K 1/02; H02K 1/148; H02K 1/18; H02K 1/182; H02K 21/24; H02K 2213/12
See application file for complete search history.

(56) References Cited

U.S. PATENT DOCUMENTS

| 2010/0225195 | A1 | 9/2010 | Asano |
| 2011/0095628 | A1 | 4/2011 | Enomoto |
| 2013/0234567 | A1* | 9/2013 | Weber ................. B29C 66/1222 310/68 D |

FOREIGN PATENT DOCUMENTS

| EP | 1593190 B1 * | 7/2008 | ............. H02K 1/148 |
| JP | 3009745 U | 4/1995 | |

(Continued)

OTHER PUBLICATIONS

Nagai, machine translation of jp2001112211, Apr. 2001 (Year: 2001).*

(Continued)

*Primary Examiner* — Eric Johnson
(74) *Attorney, Agent, or Firm* — Renner, Otto, Boisselle & Sklar, LLP

(57) ABSTRACT

A core is a core included in a rotor or a stator of an axial-gap rotating electrical machine, in which the core includes a block-shaped first member and a plate-shaped second member that are constituted by powder compacts; the first member includes a first surface that faces the second member, and a first coupling portion that is formed at the first surface; the second member includes a second surface that faces the first surface, and a second coupling portion that is formed at the second surface and that is coupled to the first coupling portion; one of the first coupling portion and the second coupling portion is constituted by a protrusion, and the other one is constituted by a recess having a shape corresponding to the protrusion.

20 Claims, 14 Drawing Sheets

(56) References Cited

FOREIGN PATENT DOCUMENTS

| | | | |
|---|---|---|---|
| JP | H7-164156 A | | 6/1995 |
| JP | 2001112211 A | * | 4/2001 |
| JP | 2003-79120 A | | 3/2003 |
| JP | 2011-91933 A | | 5/2011 |
| JP | 2017-93707 A | | 6/2017 |
| WO | 2007/114079 A1 | | 10/2007 |
| WO | WO-2017172316 A1 | * | 10/2017 .............. B01F 13/08 |

OTHER PUBLICATIONS

Garrigues, machine translation of ep1593190, Jul. 2008 (Year: 2008).*

International Search Report for corresponding Application No. PCT/JP2019/027594, dated Sep. 3, 2019.

* cited by examiner

CORE FOR, ROTATING ELECTRICAL MACHINE

TECHNICAL FIELD

The present disclosure relates to a core, a stator, and a rotating electrical machine.

The present application claims priority to Japanese Patent Application No. 2018-141841 filed on Jul. 27, 2018, and the entire contents of the Japanese patent application are incorporated herein by reference.

BACKGROUND ART

Patent Literature 1 discloses an axial-gap rotating electrical machine (electric motor or electric generator) in which a rotor and a stator are disposed to face each other in a direction along the rotating shaft of the rotor. The stator used for the rotating electrical machine includes an armature core (core) having a back yoke (yoke) and a plurality of teeth, and a coil disposed at each of the teeth. The yoke is a circular-ring-shaped member. Each of the teeth is a block-shaped member protruding from the yoke in the direction of the rotating shaft of the rotor.

The armature core of Patent Literature 1 is constituted by coupling the teeth and the yoke, which have been fabricated separately, to each other. More specifically, the yoke and the teeth are coupled to each other by fitting a columnar protruding portion provided at each of the teeth to a recessed portion (through hole or recess) provided in the yoke. Moreover, in Patent Literature 1, a multilayer steel sheet constitutes the yoke, and a dust core (powder compact) constitutes the teeth.

CITATION LIST

Patent Literature

PTL 1: International Publication No. 2007/114079

SUMMARY OF INVENTION

A core according to the present disclosure is a core included in a rotor or a stator of an axial-gap rotating electrical machine, in which the core includes a block-shaped first member and a plate-shaped second member that are constituted by powder compacts, the first member includes a first surface that faces the second member, and a first coupling portion that is formed at the first surface, the second member includes a second surface that faces the first surface, and a second coupling portion that is formed at the second surface and that is coupled to the first coupling portion, one of the first coupling portion and the second coupling portion is constituted by a protrusion, and the other one is constituted by a recess having a shape corresponding to the protrusion, and a front shape of the first coupling portion when seen in a direction orthogonal to the first surface and a front shape of the second coupling portion when seen in a direction orthogonal to the second surface are ring shapes or discontinuous ring shapes that are partly discontinuous.

A stator according to the present disclosure includes
the core according to the present disclosure; and
a coil that is disposed at each tooth included in the core.

A rotating electrical machine according to the present disclosure is an axial-gap rotating electrical machine in which a rotor and a stator are disposed side by side in an axial direction of a rotating shaft of the rotor, in which the stator is the stator according to the present disclosure.

DESCRIPTION OF EMBODIMENTS

Figure 1:
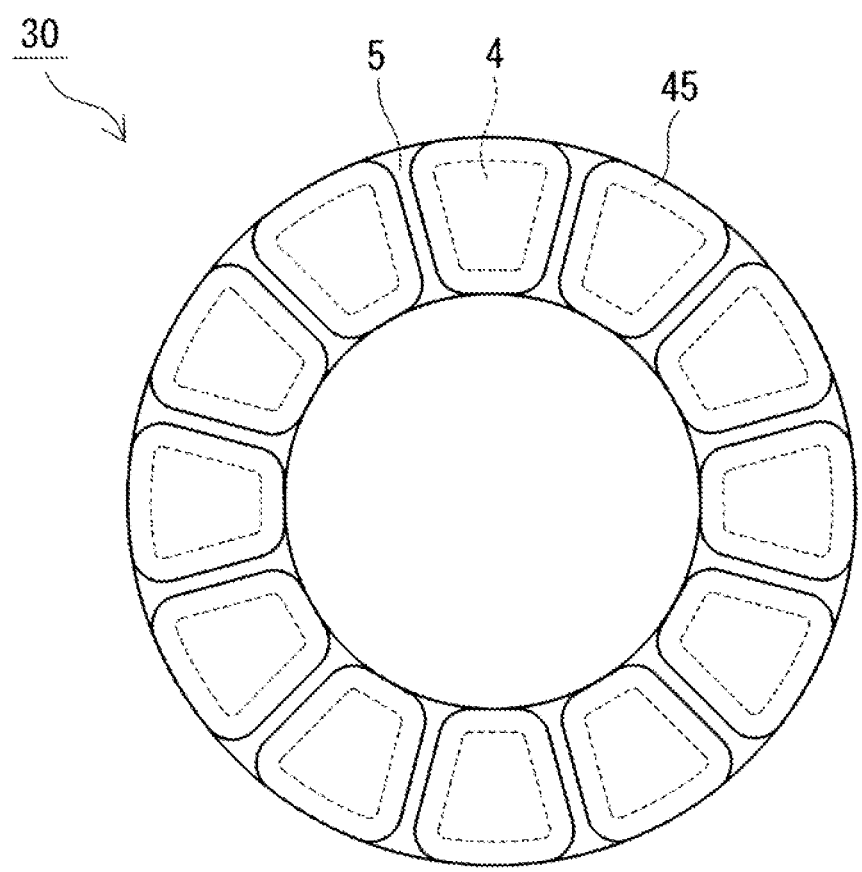
FIG. 1 is a top view of a stator included in an axial-gap rotating electrical machine according to a first embodiment.

Problems to be Solved by Present Disclosure

It is desired to improve the magnetic characteristics of a core and to improve the productivity of the core. To attain this, it is considered effective that both a yoke and teeth are constituted by high-density powder compacts. To increase the density of a powder compact, a soft magnetic powder needs to be compressed and molded under a high molding pressure (surface pressure). However, as a result of the studies by the inventors, it has been found that the yoke and the teeth having the shapes described in Patent Literature 1 are likely to have a portion with a partly low density. It has been also found that the yoke and the teeth having the shapes described in Patent Literature 1 may not be completed by one-time compression molding.

An object of the present disclosure is to provide a core of a powder compact having a high density as a whole and being excellent in productivity. In addition, another object of the present disclosure is to provide a stator including the above-described core. Furthermore, still another object of the present disclosure is to provide a rotating electrical machine including the above-described stator.

Advantageous Effects of Present Disclosure

The core of the present disclosure has a high density as a whole and being excellent in productivity. Moreover, the stator of the present disclosure is excellent in magnetic characteristics and productivity. Furthermore, the rotating electrical machine of the present disclosure is excellent in output characteristics and productivity.

DESCRIPTION OF EMBODIMENTS OF PRESENT DISCLOSURE

The inventors have studied problems expected when a block-shaped tooth and a plate-shaped yoke are each formed of a powder compact. Consequently, it has been found that a situation in which the recessed portion and the protruding portion that couple the tooth and the yoke to each other have simple shapes as described in Patent Literature 1 leads to a problem. When the tooth having the protruding portion is fabricated by compression molding, the soft magnetic powder hardly reaches a portion that becomes a corner of the protruding portion, and the density of the protruding portion (in particular, the corner of the protruding portion) is likely to be lower than that of the other portion. When the density of the protruding portion is low, the strength of the protruding portion decreases, and the protruding portion is likely to be broken. Thus, the tooth and the yoke may be no longer coupled to each other. Moreover, when the yoke having the recessed portion is fabricated by compression molding, the soft magnetic powder hardly reaches a portion that becomes an edge of the recessed portion. Thus, to fabricate the yoke having the recessed portion, compression molding to form the whole shape of the yoke is performed, and then compression molding to complete the recessed portion has to be performed. That is, it is not able to complete the yoke having the recessed portion by one-time compression molding. Regarding these problems, the inventors have found that the above-described problems can be solved by forming the recessed portion and the protruding portion into specific shapes.

Based on the above-described findings, embodiments of the present disclosure are listed below.

<1> A core according to an embodiment is a core included in a rotor or a stator of an axial-gap rotating electrical machine, in which
the core includes a block-shaped first member and a plate-shaped second member that are constituted by powder compacts,
the first member includes a first surface that faces the second member, and a first coupling portion that is formed at the first surface,
the second member includes a second surface that faces the first surface, and a second coupling portion that is formed at the second surface and that is coupled to the first coupling portion,
one of the first coupling portion and the second coupling portion is constituted by a protrusion, and the other one is constituted by a recess having a shape corresponding to the protrusion, and
a front shape of the first coupling portion when seen in a direction orthogonal to the first surface and a front shape of the second coupling portion when seen in a direction orthogonal to the second surface are ring shapes or discontinuous ring shapes that are partly discontinuous.

The above-described core has almost no portion with a locally low density of the soft magnetic powder, and hence the core has a high density as a whole. A portion with a locally low density is not formed in the core because the front shapes of the protrusion and the recess that constitute the first coupling portion and the second coupling portion are the ring shapes or the discontinuous ring shapes (hereinafter, both the ring shapes and the discontinuous ring shapes may be collectively merely referred to as ring shapes). When the protrusion has the ring shape, a difference in height appears between the protrusion, and an inner portion and an outer portion of the ring shape of the protrusion. Due to the difference in height, the soft magnetic powder easily flows between the protrusion, and the inner portion and the outer portion that are lower than the protrusion during compression molding. Moreover, when the recess has the ring shape, a difference in height appears between the recess, and an inner portion and an outer portion of the ring shape of the recess. Due to the difference in height, the soft magnetic powder easily flows between the recess, and the inner portion and the outer portion that are higher than the recess during compression molding. As long as the fluidity of the soft magnetic powder in the vicinities of the protrusion and the recess is improved, a decrease in density in the vicinities can be suppressed.

The above-described core is excellent in productivity. As described above, this is because the fluidity of the soft magnetic powder is high in the vicinities of the protrusion and the recess during compression molding of the core, and the core with a high density as a whole can be fabricated by one-time compression molding. Moreover, since the fluidity of the soft magnetic powder is high, the rate of occurrence of a defective part having a portion with a locally low density decreases.

<2> As an aspect of the core according to the embodiment, there may be provided an aspect, in which
the first member is a tooth, and
the second member is a yoke.

When the tooth and the yoke are separate members, a metal mold for fabricating the core can be formed in a simple shape. Thus, the densities of the tooth and the yoke are easily made uniform. Moreover, a plurality of teeth included in the core can be fabricated using a metal mold. Thus, the productivity of the core can be improved.

<3> As an aspect of the core according to the embodiment, there may be provided an aspect, in which
the first member is a tooth having a flange portion, and
the second member is a yoke.

When the flange portion is provided at an end surface of the tooth, detachment of the coil disposed at the tooth from the tooth hardly occurs.

<4> As an aspect of the core according to the embodiment, there may be provided an aspect, in which
the first member is an integral object of a tooth and a yoke,
the second member is a plate-shaped piece that is provided separately from the yoke, and the plate-shaped piece is disposed on an end surface of the tooth on a side opposite to the yoke and includes a flange portion that protrudes from an outline of the end surface.

When the flange portion is provided at the end surface of the tooth, detachment of the coil disposed at the tooth from the tooth hardly occurs. When the plate-shaped piece including the flange portion and the tooth are separate members, the flange portion can be formed after the coil is disposed at the tooth. Thus, the coil can be easily disposed at the core.

<5> As an aspect of the core according to the embodiment, there may be provided an aspect, in which
the first member is a tooth, and
the second member is a yoke and a plate-shaped piece that is provided separately from the yoke, and
the plate-shaped piece is disposed on an end surface of the tooth on a side opposite to the yoke and includes a flange portion that protrudes from an outline of the end surface.

This configuration is, namely, a configuration in which the tooth, the yoke, and the plate-shaped piece having the flange portion are separate components. With this configuration, a variation in density of the components constituted by powder compacts can be suppressed.

<6> As an aspect of the core according to the embodiment, there may be provided an aspect, in which
the front shape of the first coupling portion and the front shape of the second coupling portion are non-circular-ring shapes.

With the above-described configuration, after the first member and the second member are coupled to each other, relative rotation of both members on the first surface (second surface) can be suppressed.

<7> As an aspect of the core according to the embodiment, there may be provided an aspect, in which
a joint between a bottom surface and an inner wall surface of the recess and a joint between the inner wall surface and the first surface or the second surface of the recess are rounded, and
a joint between a top surface and an outer wall surface of the protrusion and a joint between the outer wall surface and the first surface or the second surface of the protrusion are rounded.

Rounding both the above-described joints can improve the fluidity of the soft magnetic powder near the protrusion and the recess during compression molding.

<8> As an aspect of the core according to the embodiment, there may be provided an aspect, in which
a depth of the recess and a height of the protrusion are 0.5 mm or more and 30% or less of a thickness of one of the first member and the second member having a smaller thickness.

When the depth of the recess and the height of the protrusion are 0.5 mm or more, the coupling strength between the protrusion and the recess can be sufficiently secured. Moreover, when the depth of the recess and the height of the protrusion are 30% or less of the thickness of the one of the first member and the second member having the smaller thickness, a decrease in fluidity of the soft magnetic powder and a burden on the metal mold during compression molding can be suppressed.

<9> As an aspect of the core according to the embodiment, there may be provided an aspect, in which
a width of the recess and a width of the protrusion are 0.5 mm or more and 10 mm or less.

When the width of the recess and the width of the protrusion are 0.5 mm or more, the coupling strength between the protrusion and the recess can be sufficiently secured. In particular, when the width of the protrusion is 1.0 mm or more, the mechanical strength of the protrusion can be sufficiently secured. Moreover, when the width of the recess and the width of the protrusion are 10 mm or less, a decrease in fluidity of the soft magnetic powder during compression molding can be suppressed.

<10> As an aspect of the core according to the embodiment, there may be provided an aspect, in which
a joint between a bottom surface and an inner wall surface of the recess and a joint between the inner wall surface and the first surface or the second surface of the recess are rounded,
a joint between a top surface and an outer wall surface of the protrusion and a joint between the outer wall surface and the first surface or the second surface of the protrusion are rounded, and
a radius of curvature of roundness of each of the joints is 0.5 mm or more and 4.0 mm or less.

Rounding the joints between surfaces in the protrusion and the recess can improve the fluidity of the soft magnetic powder during compression molding of the first member and the second member. Consequently, a portion with a locally low density hardly appears in the first member and the second member. In particular, when the radii of curvature of the roundness of the joints are 0.5 mm or more and 4.0 mm or less, the fluidity is easily improved.

<11> As an aspect of the core according to the embodiment, there may be provided an aspect, in which
the first coupling portion is a recess, and the second coupling portion is a protrusion.

The second member with the second coupling portion formed has a plate shape. Thus, when the second coupling portion is the protrusion, the mechanical strength of the second member as a whole can be improved.

<12> As an aspect of the core according to the embodiment, there may be provided an aspect, in which
the first coupling portion is a protrusion, and the second coupling portion is a recess.

The second member with the second coupling portion formed has a plate shape. Thus, when the second coupling portion is the recess, workability of assembly is improved when the first member and the second member are bonded to each other.

<13> As an aspect of the core according to the embodiment, there may be provided an aspect, in which
the front shape of the first coupling portion and the front shape of the second coupling portion each are a racetrack shape or any shape selected from a triangle, a rectangle, a trapezoid, and a rhombus whose vertices are rounded.

With the above-described shapes, the front shapes of the first coupling portion and the second coupling portion do not become excessively complicated. Thus, the mechanical strength of the first coupling portion and the second coupling portion is hardly decreased. Moreover, the above-described configuration has an advantage that the metal molds for fabricating the first member and the second member are easily fabricated.

<14> As an aspect of the core according to the embodiment, there may be provided an aspect, in which
when an area of the first surface is 100%, an area on an inner side with respect to an outline of an outer periphery of the first coupling portion is 10% or more and 80% or less, and when an area of the second surface is 100%, an area on an inner side with respect to an outline of an outer periphery of the second coupling portion is 10% or more and 80% or less.

The area of the first surface (second surface) is the planar area of the first surface (second surface) when seen in the direction orthogonal to the first surface (second surface). That is, the area of the first surface (second surface) includes the area on the inner side with respect to the outline of the outer periphery of the first coupling portion (second coupling portion). With the above-described configuration, the first member including the first coupling portion and the second member including the second coupling portion can be rigidly coupled to each other.

<15> As an aspect of the core according to the embodiment, there may be provided an aspect, in which the first member includes a third coupling portion that is formed on an inner side of a ring shape of the first coupling portion at the first surface, the second member includes a fourth coupling portion that is formed on an inner side of a ring shape of the second coupling portion at the second surface, the third coupling portion has a shape protruding or recessed on a side opposite to the first coupling portion with respect to the first surface, and the fourth coupling portion has a shape corresponding to the third coupling portion.

Coupling the third coupling portion and the fourth coupling portion to each other in addition to the coupling between the first coupling portion and the second coupling portion can further rigidly couple the first member and the second member to each other.

<16> A stator according to an embodiment includes the core according to any one of the above-described <1> to <15>; and a coil that is disposed at each tooth included in the core.

The above-described stator is excellent in magnetic characteristics. This is because the core included in the stator is the core with a high density according to the embodiment. Moreover, the above-described stator is excellent in productivity. This is because the core included in the stator is the core being excellent in productivity according to the embodiment.

<17> A rotating electrical machine according to an embodiment is an axial-gap rotating electrical machine in which a rotor and a stator are disposed side by side in an axial direction of a rotating shaft of the rotor, in which the stator is the stator according to the above-described <16>.

The rotating electrical machine is excellent in output characteristics. This is because the stator included in the rotating electrical machine is the stator being excellent in magnetic characteristics. Moreover, the above-described rotating electrical machine is excellent in productivity. This is because the stator included in the rotating electrical machine is the stator being excellent in productivity.

Details of Embodiments of Present Disclosure

Specific examples of a core, a stator, and a rotating electrical machine according to embodiments of the present disclosure are described with reference to the drawings. The same reference sign in the drawings indicates the same or corresponding part. Note that the present invention is not limited by these illustrative examples but is defined by the scope of the claims. It is intended to cover the meaning equivalent to the claims and all modifications within the scope of the claims.

First Embodiment

Rotating Electrical Machine

Figure 10:
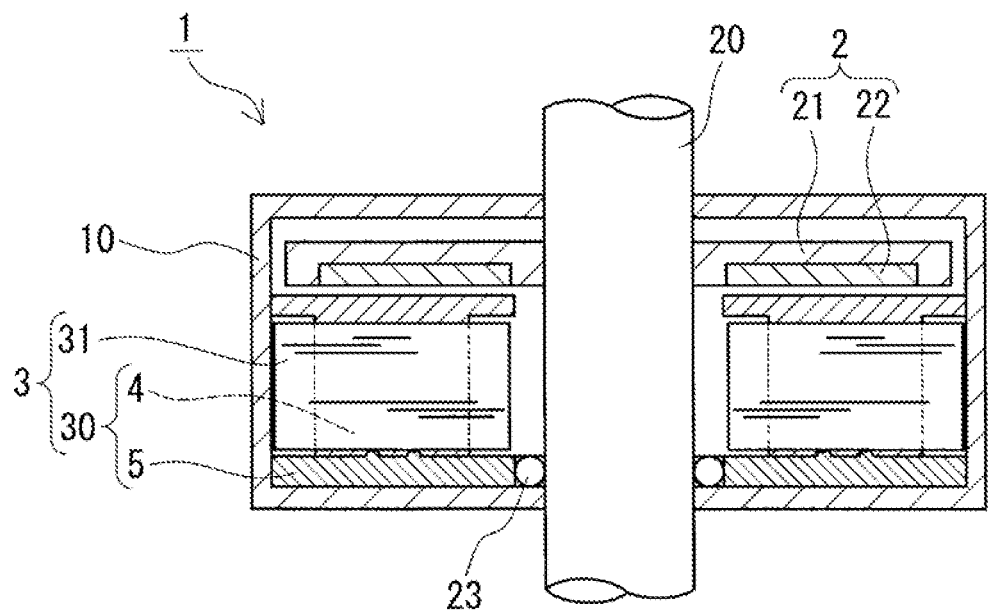
FIG. 10 is a fragmentary vertical sectional view of the axial-gap rotating electrical machine of the first embodiment.

In a first embodiment, an axial-gap rotating electrical machine 1 illustrated in FIG. 10 is described as an example. The rotating electrical machine 1 may be an electric generator or an electric motor (motor). The rotating electrical machine 1 includes a rotor 2 and a stator 3 disposed in a housing 10.

Rotor

The rotor 2 includes a plurality of flat-plate-shaped magnets 22 and a circular-ring-shaped holding plate 21 that supports the magnets 22. The holding plate 21 is fixed to a shaft 20 and rotates together with the shaft 20. The magnets 22 are embedded in the holding plate 21. The magnets 22 are disposed to be spaced apart in the circumferential direction of the shaft 20. Moreover, the magnets 22 are magnetized in the direction of the rotating shaft of the rotor 2 (the axial direction of the shaft 20). The magnetization directions of the magnets 22 adjacent to each other in the circumferential direction of the shaft 20 are opposite to each other.

Stator

The stator 3 includes a core 30 and a coil 31 disposed at a tooth 4 of the core 30. The stator 3 is disposed to face the rotor 2 in the axial direction of the shaft 20 and is fixed to the housing 10. A bearing 23 is disposed between the stator 3 and the shaft 20, and the stator 3 does not rotate. The rotating electrical machine 1 according to the present embodiment has a feature in the stator 3, or more particularly in the core 30 included in the stator 3.

Core

Figure 2:
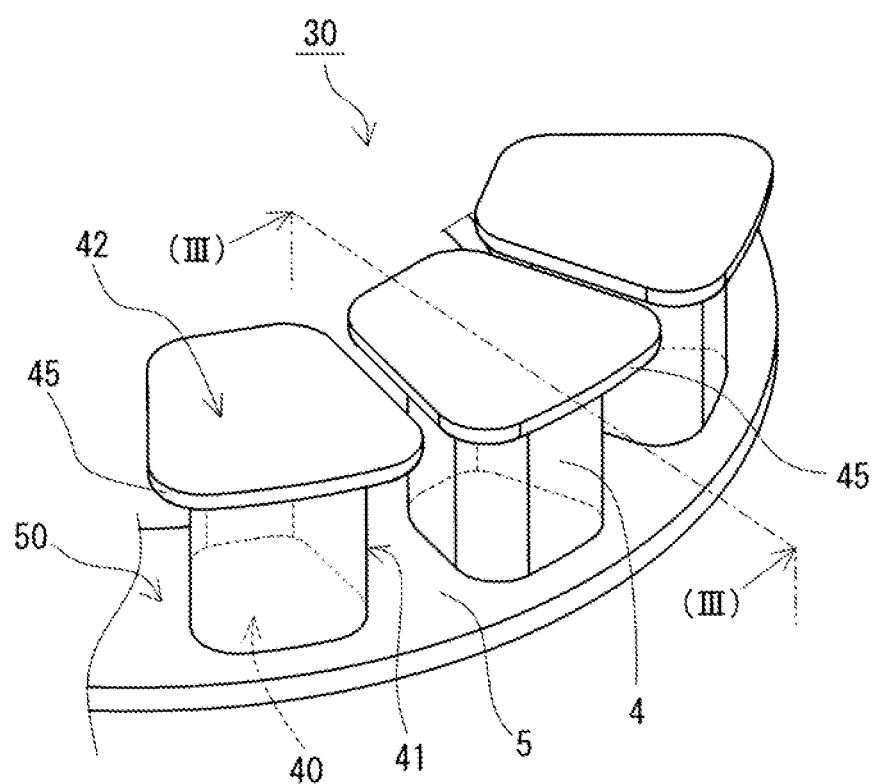
FIG. 2 is a perspective view illustrating a portion of the stator in FIG. 1.
Figure 3:
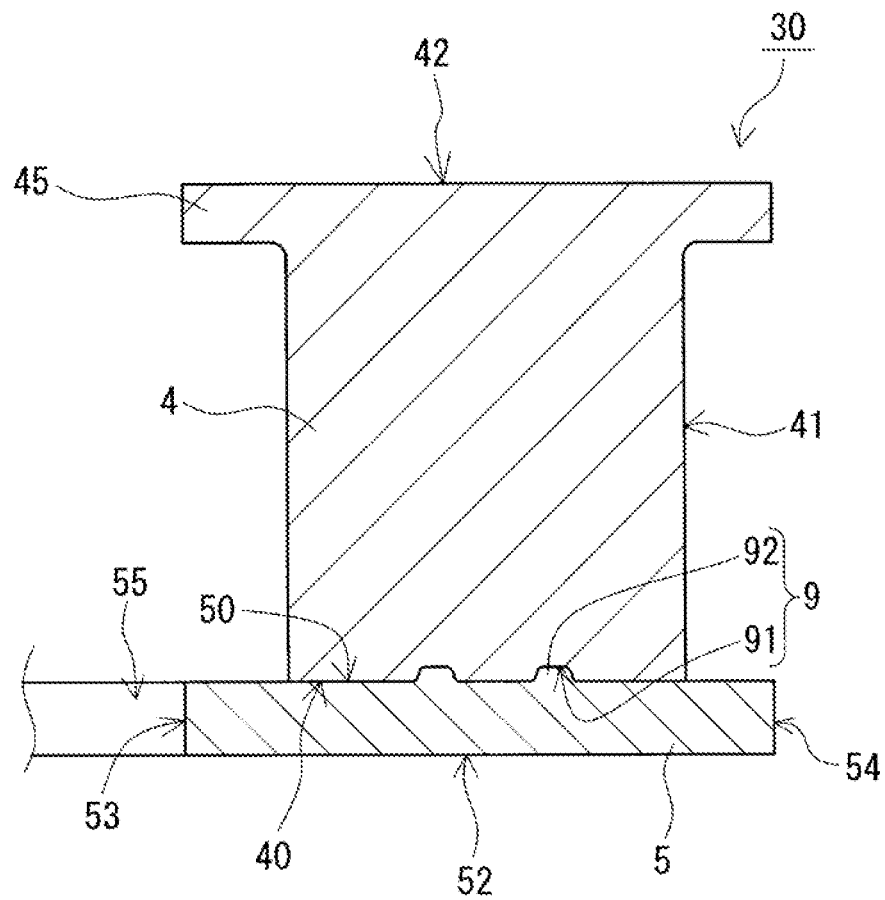
FIG. 3 is a sectional view taken along line in FIG. 2.

The core 30 illustrated in FIGS. 1 to 3 includes teeth 4 and a yoke 5. In this example, 12 teeth 4 are formed at the core 30. The number of teeth 4 is not particularly limited. In the case of the axial-gap rotating electrical machine 1, adjacent two teeth 4 form a magnetic circuit via the yoke 5, and hence the number of teeth 4 is preferably 2 n (n is a natural number). In this example, the teeth 4 each serve as a block-shaped first member, the yoke 5 serves as a plate-shaped second member, and the teeth 4 and the yoke 5 are fabricated separately. The teeth 4 and the yoke 5 fabricated separately are coupled to each other by a coupling mechanism 9 illustrated in FIG. 3. The details of the coupling mechanism 9 will be described later.

Teeth

The teeth (first member) 4 are described mainly with reference to FIGS. 4, 5A, 5B, and 6. Each of the teeth 4 in this example is a substantially trapezoidal columnar member having a flange (flange portion 45) at an end portion on the side opposite to the yoke 5 (FIG. 3). The shape of the tooth 4 is not particularly limited. For example, the tooth 4 may have a substantially triangular columnar shape. For another example, the tooth 4 may have a circular columnar shape or a quadrangular columnar shape.

The tooth 4 includes a first surface 40, a peripheral surface 41, and an end surface 42. The first surface 40 is a flat surface and is a lower surface of the tooth 4 facing the yoke 5 (FIG. 3). The end surface 42 is an upper surface of the tooth 4 on the side opposite to the first surface 40. The peripheral surface 41 is a surface that connects the first surface 40 and the end surface 42 to each other. A first coupling portion 91 of the coupling mechanism 9, which will be described later, is formed at the first surface 40 of the tooth 4.

The flange portion 45 included in the tooth 4 may be omitted. However, in the case of the axial-gap rotating electrical machine 1 (FIG. 10), a larger facing area of the tooth 4 facing the rotor 2 is more advantageous to improve the performance. Thus, the flange portion 45 that protrudes in a direction orthogonal to a protruding direction of the tooth 4 is formed at an end portion of the tooth 4 on the side opposite to the yoke 5 in this example. The outline of the outer periphery of the flange portion 45 in this example is substantially similar to the outline of the outer periphery of the first surface 40. The flange portion 45 also has a role of suppressing detachment of the coil 31 disposed at the tooth 4 from the tooth 4.

The tooth 4 is a powder compact obtained by compression molding a soft magnetic powder. The soft magnetic powder is an aggregate of soft magnetic particles. Examples of the soft magnetic powder include pure iron (purity is 99% by mass or more), and at least a kind of powder selected from iron-based alloys of an Fe—Si—Al-based alloy (sendust), an Fe—Si-based alloy (silicon steel), an Fe—Al-based alloy, and an Fe—Ni-based alloy (permalloy). The soft magnetic particles preferably have an insulating coating on the surfaces thereof. When the insulating coating is formed on the surfaces of the soft magnetic particles, electric insulation can be secured among the soft magnetic particles. Thus, an iron loss of the tooth 4 caused by an eddy current loss can be decreased. The insulating coating may be, for example, a phosphate coating or a silica coating.

The average particle size of the soft magnetic particles is preferably 10 μm or more and 300 μm or less. When the average particle size of the soft magnetic particles is 10 μm or more, the fluidity of the soft magnetic powder is not decreased, and increases in coercivity and hysteresis loss of the powder compact can be suppressed. In contrast, when the average particle size of the soft magnetic particles is 300 μm or less, the eddy current loss of the powder compact that is generated in a high frequency range can be effectively decreased. The average particle size of the soft magnetic particles is more preferably 40 μm or more and 260 μm or less. In this case, the average particle size represents the particle size of particles when the sum of mass of particles in the order from a smaller particle size reaches 50% of the total mass in the histogram of particle sizes, that is, D50 particle size.

The relative density of the powder compact is preferably 90% or more. Increasing the density can improve the magnetic characteristics of the powder compact. The relative density is more preferably 93% or more. The relative density represents a proportion (%) of the density of a powder compact with respect to the true density of the powder compact (soft magnetic powder).

Yoke

Figure 7:
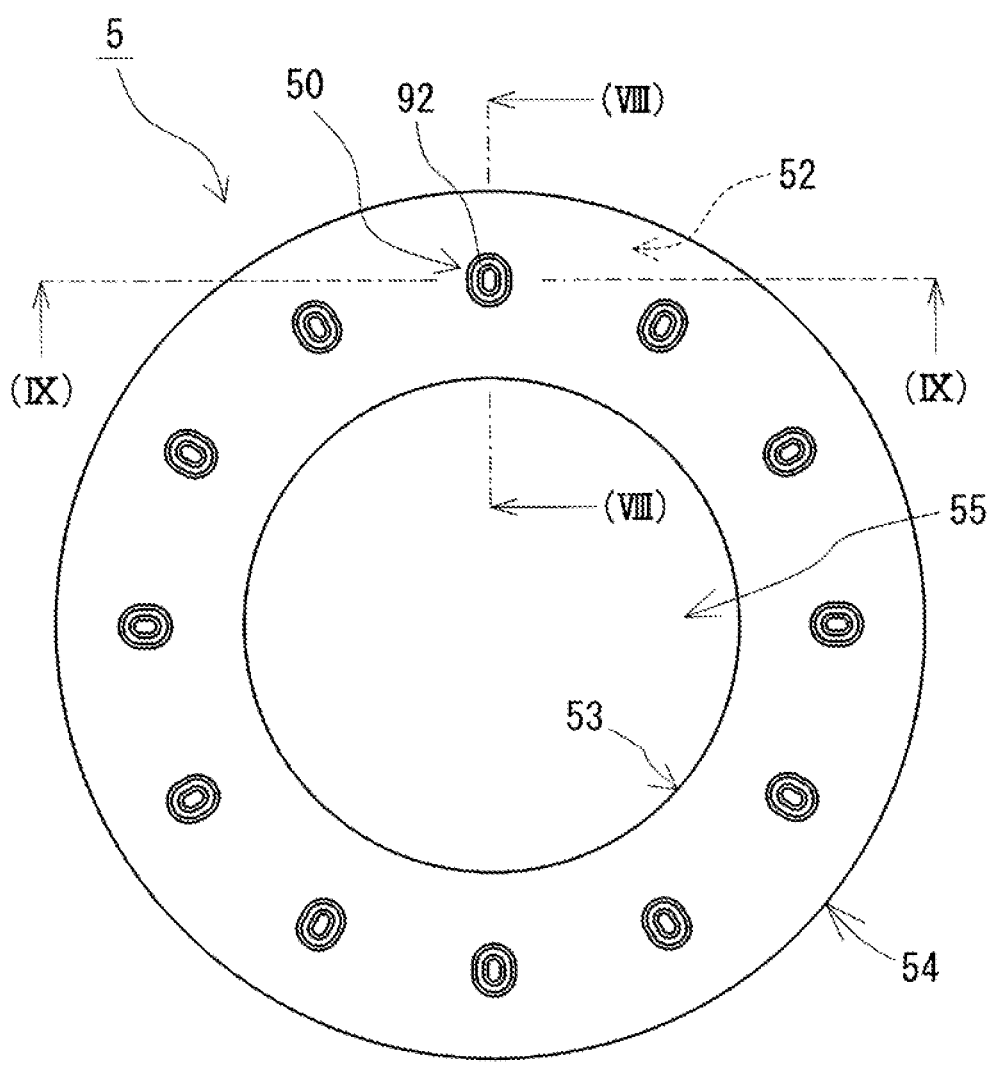
FIG. 7 is a top view of a yoke included in the stator in FIG. 1.

The yoke 5 is described mainly with reference to FIGS. 7, 8A, 8B, and 9. As illustrated in FIG. 7, the yoke 5 is a circular-ring-shaped member. The yoke 5 in this example is constituted by a member. The yoke 5 may be constituted by combining a plurality of divided pieces. For example, the circular-ring-shaped yoke 5 may be formed by connecting fan-shaped divided pieces to each other.

The yoke 5 includes a second surface 50, a back surface 52, an inner edge surface 53, and an outer edge surface 54. The second surface 50 is a surface that faces the first surface 40 as illustrated in FIG. 3. The second surface 50 is a flat surface that is parallel to the first surface 40. Thus, the entire surface of the first surface 40 of each tooth 4 comes into surface contact with the second surface 50. The back surface 52 of the yoke 5 is a lower surface of the yoke 5 that is parallel to the second surface 50. The edge surface 53 is a surface that connects the second surface 50 and the back surface 52 to each other on the inner side of the circular ring of the yoke 5. A through hole 55 through which the shaft 20 (FIG. 10) penetrates is formed on the inner side of the edge surface 53. The edge surface 54 is a surface that connects the second surface 50 and the back surface 52 to each other on the outer side of the circular ring of the yoke 5. A second coupling portion 92 of the coupling mechanism 9, which will be described later, is formed at the second surface 50 of the yoke 5.

The yoke 5 is constituted by a powder compact similarly to the tooth 4. The composition of the powder compact that constitutes the yoke 5 may be the same as or may differ from the composition of the powder compact that constitutes the tooth 4. The density of the yoke 5 may be the same as or may differ from the density of the tooth 4.

Coupling Mechanism

The coupling mechanism 9 includes the first coupling portion 91 and the second coupling portion 92. The first coupling portion 91 is a recess that is formed in the first surface 40, and the second coupling portion 92 is a protrusion protruding from the second surface 50. The internal shape of the first coupling portion 91 (recess) is a shape corresponding to the external shape of the second coupling portion 92 (protrusion). Thus, by fitting the second coupling portion 92 to the first coupling portion 91, the outer peripheral surface of the second coupling portion 92 comes into surface contact with the inner peripheral surface of the first coupling portion 91. Consequently, the tooth 4 is coupled to the yoke 5.

First Coupling Portion

Figure 4:
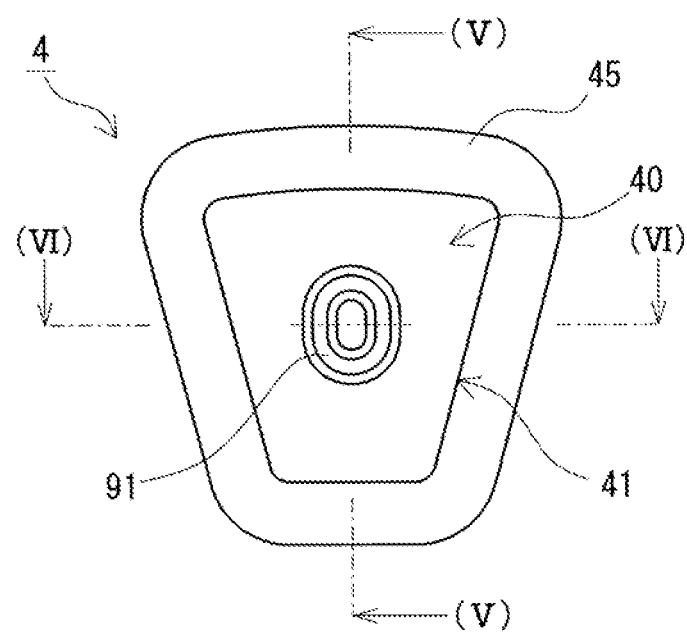
FIG. 4 is a bottom view of a tooth included in the stator in FIG. 1.
Figure 5A:
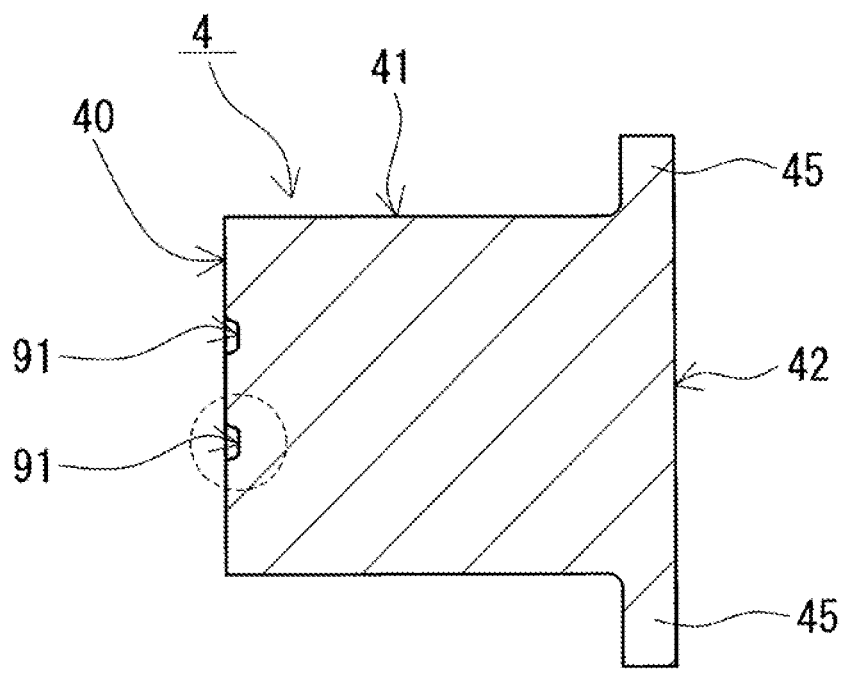
FIG. 5A is a sectional view taken along line V-V in FIG. 4.

The shape of the first coupling portion 91 (recess) is described in detail with reference to FIGS. 4, 5A, and 5B. As illustrated in FIG. 4, the front shape of the first coupling portion 91 when seen in a direction orthogonal to the first surface 40 is a ring shape. The front shape of the first coupling portion 91 in this example is a racetrack shape. The front shape of the first coupling portion 91 may be a circular-ring shape or may be a non-circular-ring shape including the racetrack shape in this example. Examples of the non-circular-ring shape other than the racetrack shape include a polygonal shape whose vertices are rounded, such as a triangle, a rectangle (including a square), a trapezoid, or a rhombus; and a discontinuous ring shape, such as a C shape or a U shape in which the ring is not partly connected. When the front shape of the first coupling portion 91 is a non-circular-ring shape, the tooth 4 can be inhibited from rotating relative to the yoke 5 on the first surface 40 (second surface 50) after the tooth 4 is coupled to the yoke 5. Alternatively to the illustrative example in FIG. 4, when the first coupling portion 91 is divided into two on the inner side and the outer side in the radial direction of the yoke 5 (FIG. 1), an upper portion and a lower portion of the sheet sandwiching a division line (see a two-dot chain line in FIG. 4) may be asymmetric to each other. In this case, the direction of the tooth 4 with respect to the yoke 5 is limited, and hence the tooth 4 is no longer misaligned.

The inner side of the ring shape of the first coupling portion 91 (recess) has the same height as the height of the first surface 40. Alternatively to this example, the inner side of the ring shape of the first coupling portion 91 may be recessed with respect to the first surface 40, or may protrude from the first surface 40 like a third embodiment which will be described later.

In this example, the number of the first coupling portion 91 at the tooth 4 is one. A plurality of first coupling portions 91 may be provided at a tooth 4. When the plurality of first coupling portions 91 are formed, some of the first coupling portions 91 may be recesses and the others may be protrusions.

Figure 5B:
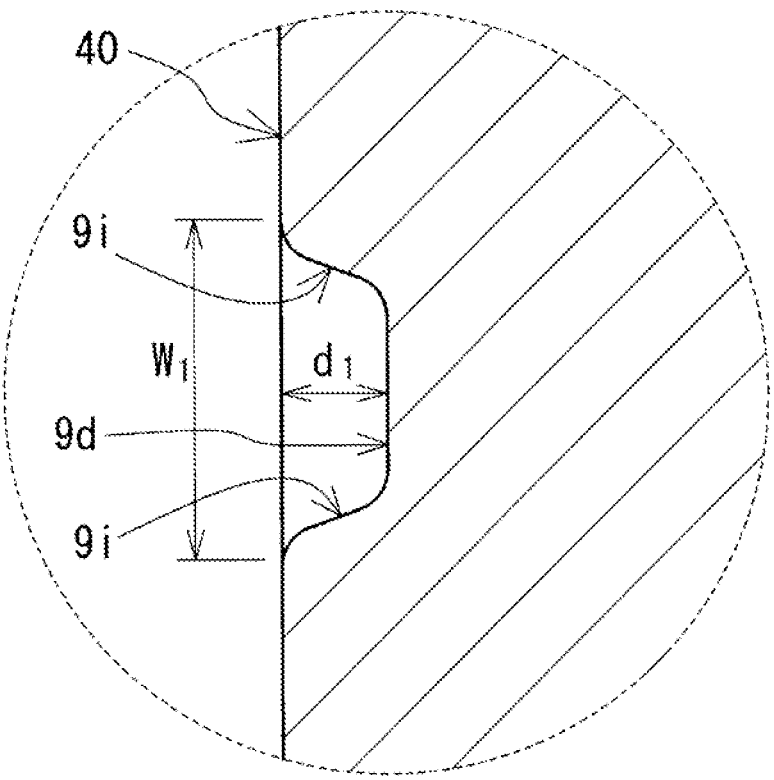
FIG. 5B is an enlarged view of a portion circled in FIG. 5A.
Figure 6:
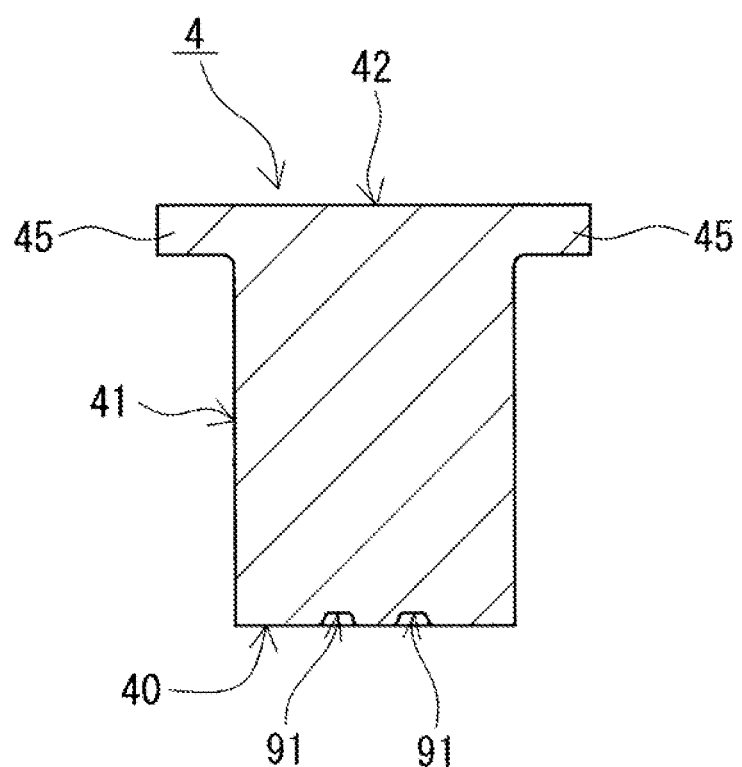
FIG. 6 is a sectional view taken along line VI-VI in FIG. 4.

The width of the first coupling portion 91 (recess) in this example gradually decreases toward the deep side in the depth direction as illustrated in FIG. 5B. That is, the width of a bottom surface $9d$ of the first coupling portion 91 is smaller than the width of an opening portion of the first coupling portion 91. Moreover, an inner wall surface $9i$ is inclined in a direction to expand from the bottom surface $9d$ toward the opening portion. The recess having such a shape contributes to improvement in the fluidity of the soft magnetic powder during compression molding. Needless to say, the width of the recess may be uniform in the depth direction. In this case, the width of the first coupling portion 91 is a length of the first coupling portion 91 in a direction orthogonal to the circumferential direction of the ring shape of the first coupling portion 91 (the thickness direction of the sheet of FIG. 5B).

The joint between the bottom surface $9d$ and the inner wall surface $9i$ of the first coupling portion 91 (recess) is rounded. The joint between the inner wall surface $9i$ and the first surface 40 is also rounded. Rounding both the joints can improve the fluidity of the soft magnetic powder during compression molding. For example, the radius of curvature of the roundness can be 0.5 mm or more and 4.0 mm or less. The radius of curvature is more preferably 1.0 mm or more and 3.0 mm or less.

A width $w_1$ of the first coupling portion 91 (recess) is preferably 0.5 mm or more and 10 mm or less. The width $w_1$ is the width of the opening portion of the recess. When the width $w_1$ is 0.5 mm or more, the coupling strength between the first coupling portion 91 (recess) and the second coupling portion 92 (protrusion) can be sufficiently secured. When the width $w_1$ is 10 mm or less, a decrease in fluidity of the soft magnetic powder during compression molding can be suppressed. The width $w_1$ is more preferably 0.5 mm or more and 4 mm or less. The width $w_1$ is further preferably 1.0 mm or more and 3.0 mm or less.

A depth $d_1$ of the first coupling portion 91 (recess) is preferably 0.5 mm or more and 30% or less of the thickness of one of the first member and the second member having a smaller thickness (in this example, the yoke 5). The depth $d_1$ is a length of a perpendicular from the first surface 40 to the bottom surface $9d$. When the depth $d_1$ is 0.5 mm or more, the coupling strength between the first coupling portion 91 (recess) and the second coupling portion 92 (protrusion) can be sufficiently secured. When the depth $d_1$ is 30% or less of the thickness of the yoke 5, a decrease in fluidity of the soft magnetic powder during compression molding can be suppressed. The depth $d_1$ is more preferably 1.0 mm or more and 25% or less of the thickness of one of the first member and the second member having a smaller thickness.

The size of the outline of the outer periphery (see FIG. 4) of the first coupling portion 91 at the first surface 40 can be appropriately selected. For example, when the area of the first surface 40 is 100%, the area on the inner side with respect to the outline of the outer periphery of the first coupling portion 91 can be 10% or more and 80% or less. When the proportion of the area of the external shape of the first coupling portion 91 in the first surface 40 is set to 10% or more and 80% or less, the tooth 4 and the yoke 5 can be rigidly coupled to each other. The proportion of the area is more preferably 20% or more and 70% or less.

Second Coupling Portion

The shape of the second coupling portion 92 (protrusion) is described in detail with reference to FIGS. 7 and 8. As described above, the second coupling portion 92 has a shape corresponding to the first coupling portion 91. As illustrated in FIG. 7, the front shape of the second coupling portion 92 when seen in a direction orthogonal to the second surface 50 has the same shape and the same size as those of the front shape of the first coupling portion 91.

The inner side of the ring shape of the second coupling portion 92 (protrusion) has the same height as that of the second surface 50. Alternatively to this example, the inner side of the ring shape of the second coupling portion 92 may protrude with respect to the second surface 50, or may be recessed with respect to the second surface 50 like a fourth embodiment which will be described later.

Figure 8A:
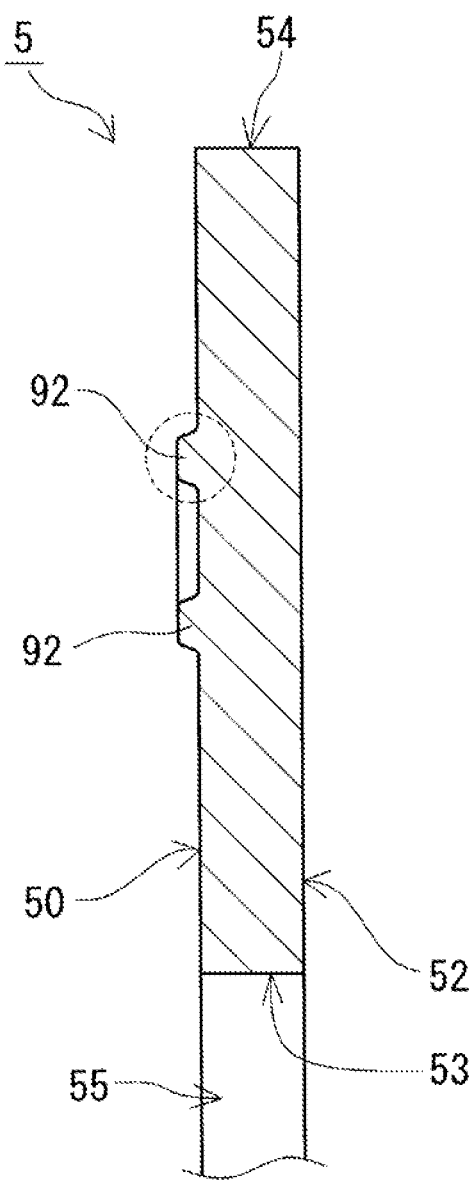
FIG. 8A is a sectional view taken along line VIII-VIII in FIG. 7.
Figure 8B:
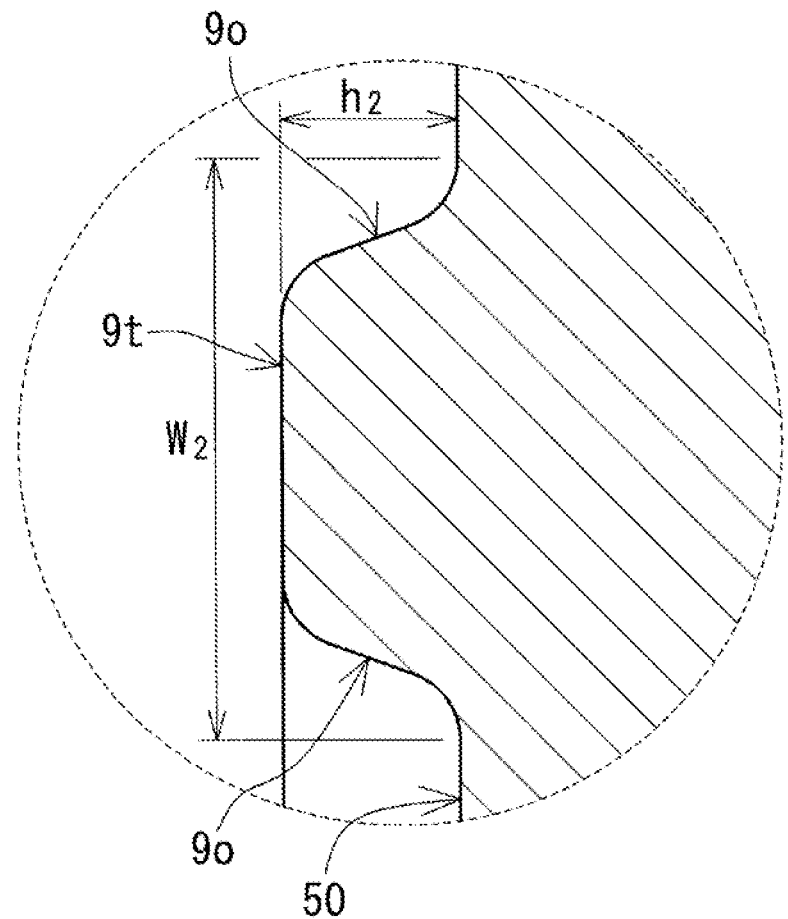
FIG. 8B is an enlarged view of a portion circled in FIG. 8A.
Figure 9:
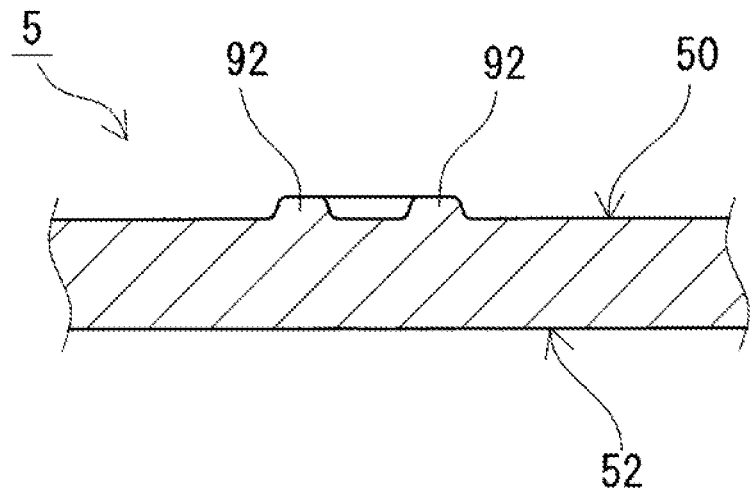
FIG. 9 is a sectional view taken along line IX-IX in FIG. 7.

The width of the second coupling portion 92 (protrusion) in this example gradually decreases toward a top surface $9t$ as illustrated in FIG. 8B. That is, the width of the top surface $9t$ of the second coupling portion 92 is smaller than the width of the base of the second coupling portion 92. Moreover, an outer wall surface 90 is inclined in a direction to narrow from the base toward the top surface $9t$. The protrusion having such a shape contributes to improvement in the fluidity of the soft magnetic powder during compression molding. In this case, the width of the second coupling portion 92 is a length of the second coupling portion 92 in a direction orthogonal to the circumferential direction of the ring shape of the second coupling portion 92 (the thickness direction of the sheet of FIG. 8B).

The joint between the top surface $9t$ and the outer wall surface 90 and the joint between the outer wall surface 90 and the second surface 50 of the second coupling portion 92 (protrusion) are rounded to meet the shape of the first coupling portion 91 (recess). Rounding both the joints of the protrusion can improve the fluidity of the soft magnetic powder during compression molding.

A width $w_2$ of the second coupling portion 92 (protrusion) is the same as the width $w_1$ of the first coupling portion 91 (recess) in FIG. 5B. The width $w_2$ is the width of the base of the protrusion. A height $h_2$ of the second coupling portion 92 (protrusion) is the same as the depth $d_1$ of the first coupling portion 91 (recess) in FIG. 5B. The height $h_2$ is a length of a perpendicular from a plane extending from the top surface $9t$ to the second surface 50. The limitations on the width $w_2$ and the height $h_2$ of the protrusion contribute to improvement in the mechanical strength of the protrusion. The limitations on the width $w_2$ and the height $h_2$ of the protrusion contribute to improvement in the fluidity of the soft magnetic powder near the protrusion during compression molding.

Advantageous Effects of Present Embodiment

The core 30 (FIG. 1) of the embodiment has almost no portion with a locally low density of the soft magnetic powder, and hence the core 30 has a high density as a whole. A portion with a locally low density is not formed in the core 30 because the front shapes of the protrusion and the recess that constitute the first coupling portion 91 and the second coupling portion 92 are the ring shapes or the discontinuous ring shapes.

The core 30 of the embodiment is excellent in productivity. This is because the fluidity of the soft magnetic powder is high in the vicinities of the protrusion and the recess during compression molding of the core 30, and the core 30 with a high density as a whole can be fabricated by one-time compression molding. Moreover, since the fluidity of the soft magnetic powder is high, the rate of occurrence of a defective part having a portion with a locally low density decreases. This is also the cause of improvement in the productivity of the core 30.

In this example, the tooth 4 and the yoke 5 are separate members. Thus, the metal mold for fabricating the core 30 can be formed in a simple shape. Consequently, the densities of the tooth 4 and the yoke 5 are easily made uniform. Moreover, the plurality of teeth 4 included in the core 30 can be fabricated using a metal mold. Consequently, the productivity of the core 30 can be improved.

In this example, the second coupling portion 92 formed at the yoke 5 is the protrusion. Thus, a decrease in the mechanical strength of the yoke 5 due to the provision of the second coupling portion 92 can be suppressed.

The stator 3 (FIG. 10) including the core 30 of the above-described embodiment is excellent in magnetic characteristics. This is because the density of the magnetic powder of the stator 3 is high. Moreover, the stator 3 is excellent in productivity. This is because the productivity of the core 30 included in the stator 3 is high.

The rotating electrical machine 1 including the stator 3 of the above-described embodiment is excellent in output characteristics. This is because the magnetic characteristics of the stator 3 included in the rotating electrical machine 1 is high. Moreover, the rotating electrical machine 1 is excellent in productivity. This is because the productivity of the stator 3 included in the rotating electrical machine 1 is high.

Second Embodiment

In a second embodiment, a core 30 that differs from the core 30 in the first embodiment is described with reference to FIG. 11. The way of viewing FIG. 11 is the same as that in FIG. 3 of the first embodiment.

Figure 11:
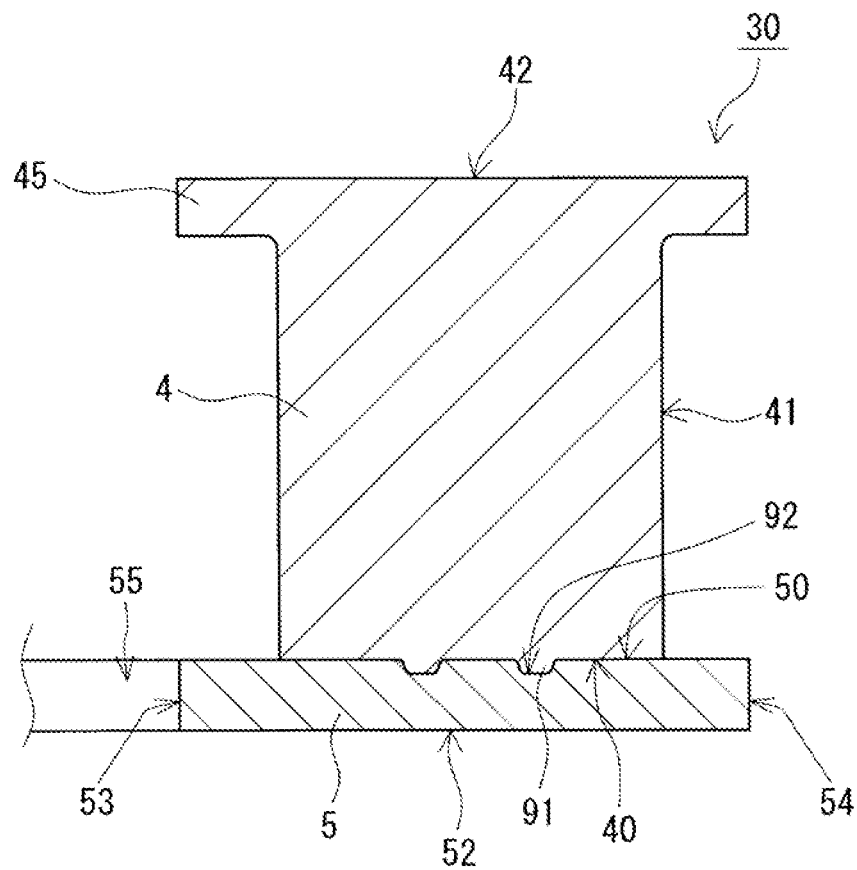
FIG. 11 is a fragmentary sectional view describing the coupling state of a tooth and a yoke of a rotating electrical machine according to a second embodiment.

In the core 30 in FIG. 11, a first coupling portion 91 of a tooth 4 is a protrusion, and a second coupling portion 92 of a yoke 5 is a recess. The shapes and sizes of the protrusion and the recess may be the same as those of the first embodiment. Also with the configuration in this example, advantageous effects similar to those of the first embodiment can be obtained.

Third Embodiment

In a third embodiment, a core 30 in which a tooth 4 has a third coupling portion 93 and a yoke 5 has a fourth coupling portion 94 is described with reference to FIGS. 12A and 12B.

The third coupling portion 93 is a protrusion that is formed on the inner side of the ring shape of the first coupling portion 91 at the first surface 40 and that protrudes from the first surface 40. A height $h_3$ of the third coupling portion 93 in this example is larger than the height $h_2$ of the second coupling portion 92 (protrusion). The height $h_3$ of the third coupling portion 93 is a length of a perpendicular from the first surface 40 to a top surface of the protrusion. The preferable range of the height $h_3$ is the same as the preferable range of the height $h_2$.

Figure 12A:
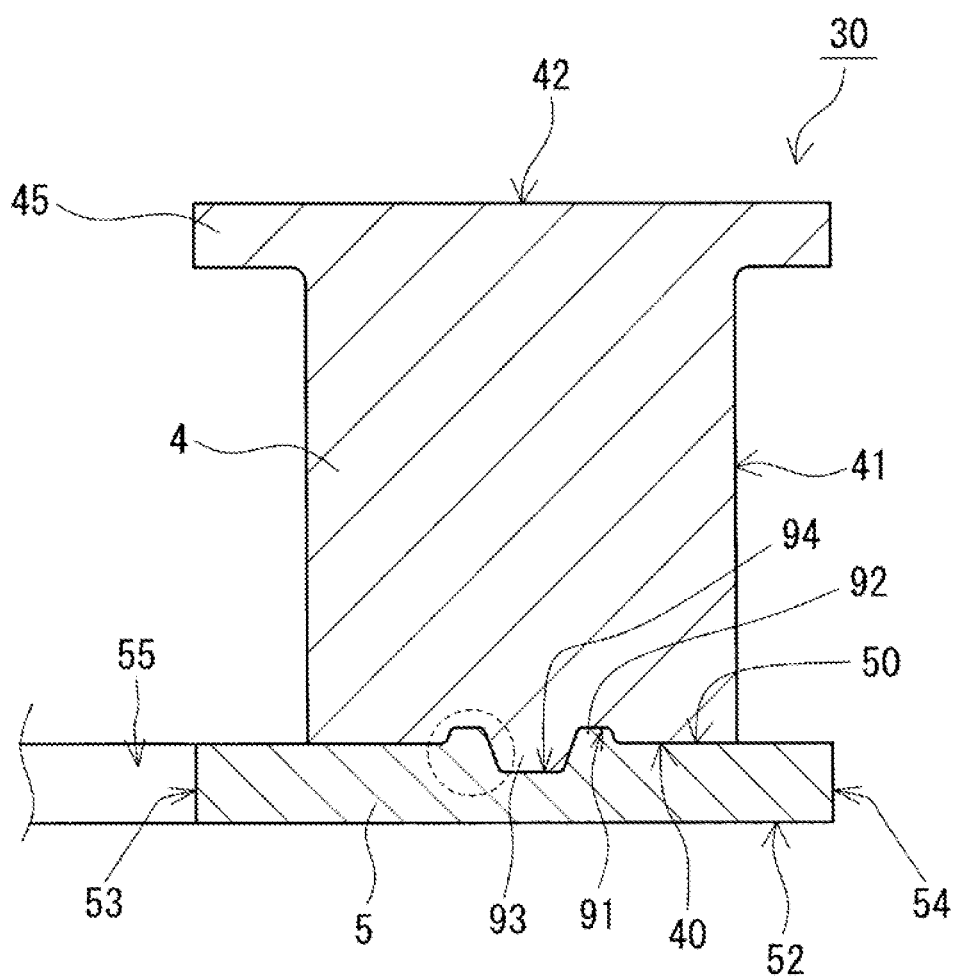
FIG. 12A is a fragmentary sectional view describing the coupling state of a tooth and a yoke of a rotating electrical machine according to a third embodiment.
Figure 12B:
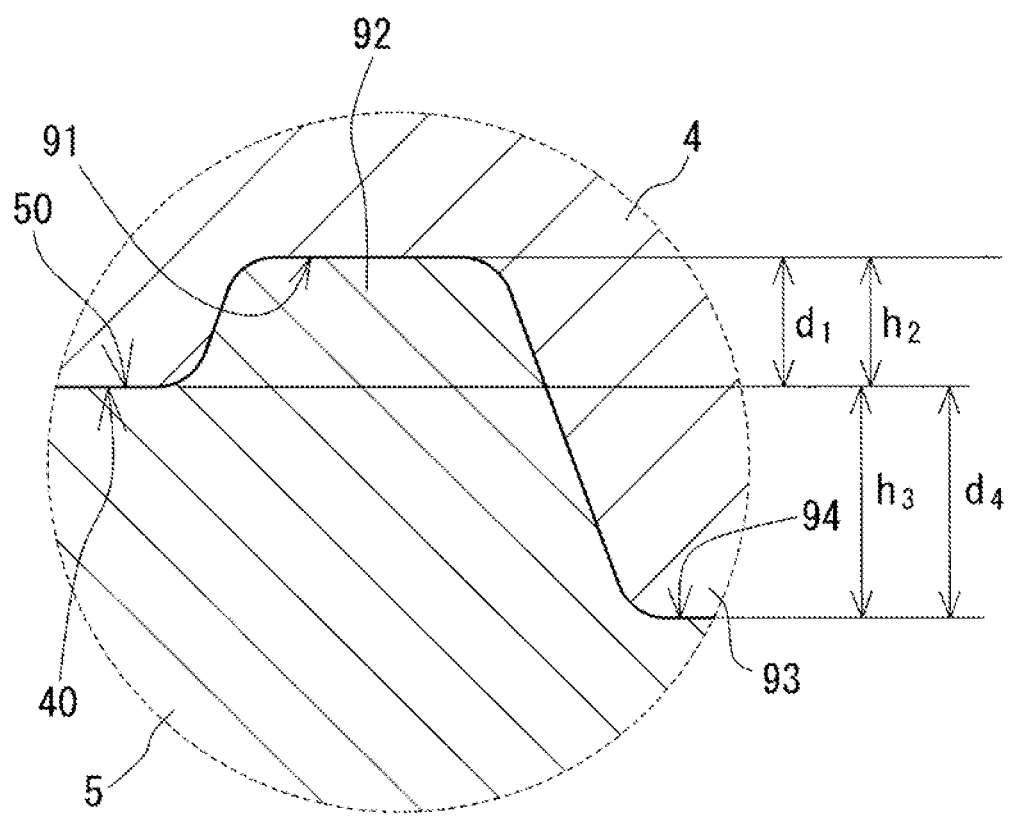
FIG. 12B is an enlarged view of a portion circled in FIG. 12A.

As illustrated in FIG. 12A, the fourth coupling portion 94 is a recess that is formed on the inner side of the ring shape of the second coupling portion 92 at the second surface 50 and that is lowered with respect to the second surface 50. The internal shape of the fourth coupling portion 94 (recess) is a shape corresponding to the external shape of the third coupling portion 93 (protrusion). Thus, as illustrated in FIG. 12B, a depth $d_4$ of the fourth coupling portion 94 (recess) in this example is the same as the height $h_3$ of the third coupling portion 93 (protrusion).

With the configuration in this example, the tooth 4 and the yoke 5 can be coupled to each other more rigidly compared with the core 30 according to any one of the first and second embodiments.

Fourth Embodiment

In a fourth embodiment, a core 30 that differs from the core 30 in the third embodiment is described with reference to FIGS. 13A and 13B.

Figure 13A:
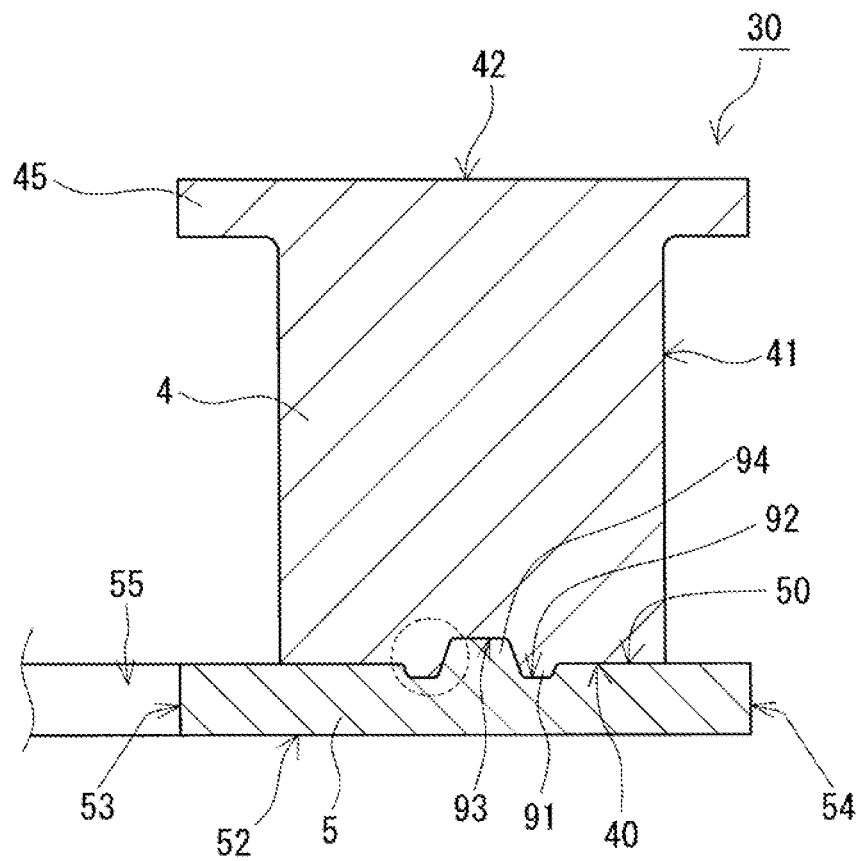
FIG. 13A is a fragmentary sectional view describing the coupling state of a tooth and a yoke of a rotating electrical machine according to a fourth embodiment.
Figure 13B:
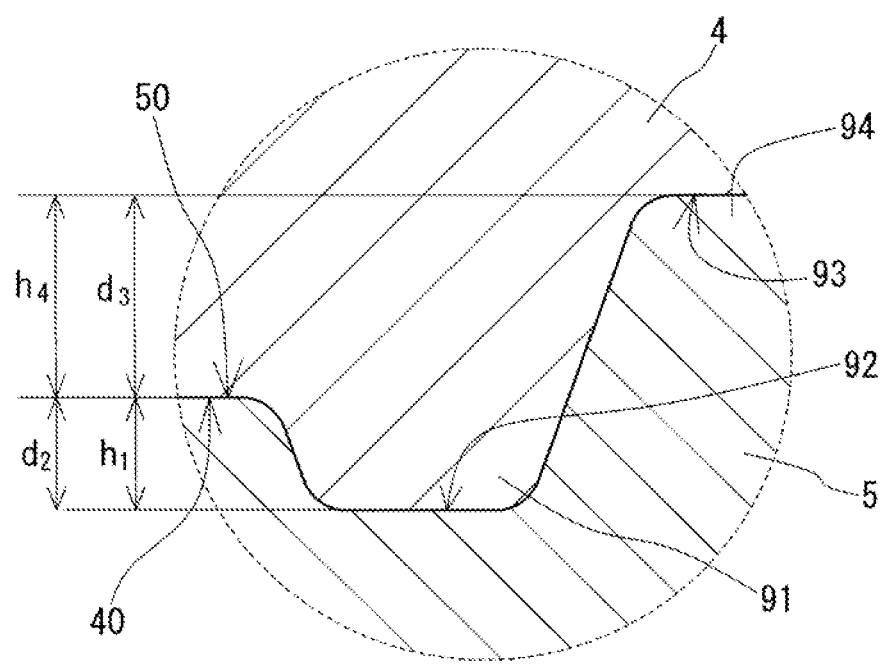
FIG. 13B is an enlarged view of a portion circled in FIG. 13A.

As illustrated in FIG. 13A, a third coupling portion 93 in this example is a recess that is formed on the inner side of the ring shape of the first coupling portion 91 at the first surface 40. In contrast, a fourth coupling portion 94 is a protrusion that is formed on the inner side of the ring shape of the second coupling portion 92 at the second surface 50.

Also in this example, the internal shape of the third coupling portion 93 (recess) is a shape corresponding to the external shape of the fourth coupling portion 94 (protrusion). Thus, as illustrated in FIG. 13B, a depth $d_3$ of the third coupling portion 93 in this example is the same as a height $h_4$ of the fourth coupling portion 94.

Fifth Embodiment

Figure 14:
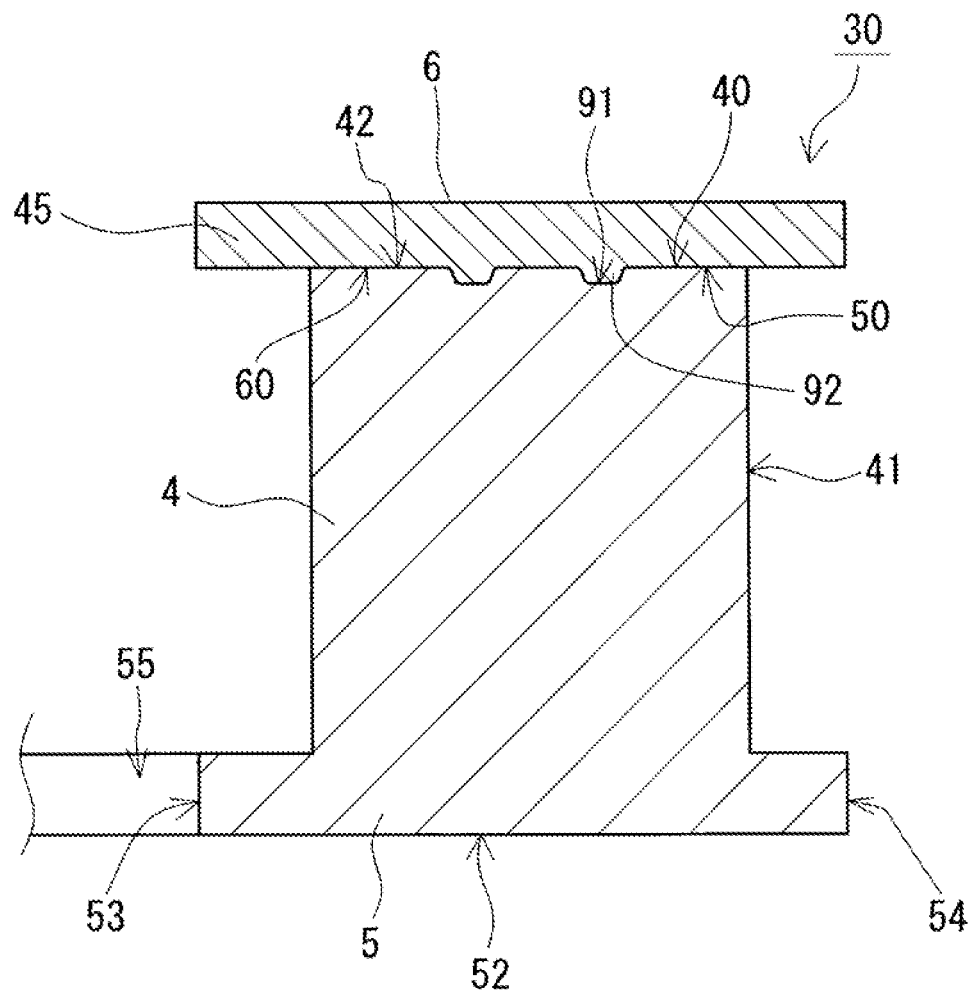
FIG. 14 is a fragmentary sectional view describing the coupling state of a tooth and a plate-shaped piece of a rotating electrical machine according to a fifth embodiment.

In a fifth embodiment, a core 30 in which a tooth 4 and a plate-shaped piece 6 that is disposed on the side of the tooth 4 opposite to a yoke 5 are coupled to each other is described with reference to FIG. 14.

The tooth 4 in this example is integrally formed with the yoke 5. The tooth 4 and the yoke 5 may be separately provided like the core 30 according to any one of the first to fourth embodiments. In this case, although the number of components that constitute the core 30 increases, the entire density of the core 30 is easily made uniform.

The plate-shaped piece 6 is provided on an end surface 42 of the tooth 4 on the side opposite to the yoke. The plate-shaped piece 6 is fabricated separately from the tooth 4 and is coupled to the tooth 4. That is, the tooth 4 is a first member, and the plate-shaped piece 6 is a second member. Moreover, the end surface 42 of the tooth 4 (first member) is also a first surface 40 that faces the plate-shaped piece 6 (second member). A facing surface 60 of the plate-shaped piece 6 that faces the first surface 40 is a second surface 50.

A first coupling portion 91 constituted by a ring-shaped recess is formed in the first surface 40 of the tooth 4. A second coupling portion 92 constituted by a ring-shaped protrusion is formed at the second surface 50 of the plate-shaped piece 6.

With the configuration in this example, a flange portion 45 can be formed at the tooth 4 after the coil 31 (FIG. 10) is disposed at the tooth 4. In this case, the coil 31 is very easily disposed.

Sixth Embodiment

Figure 15:
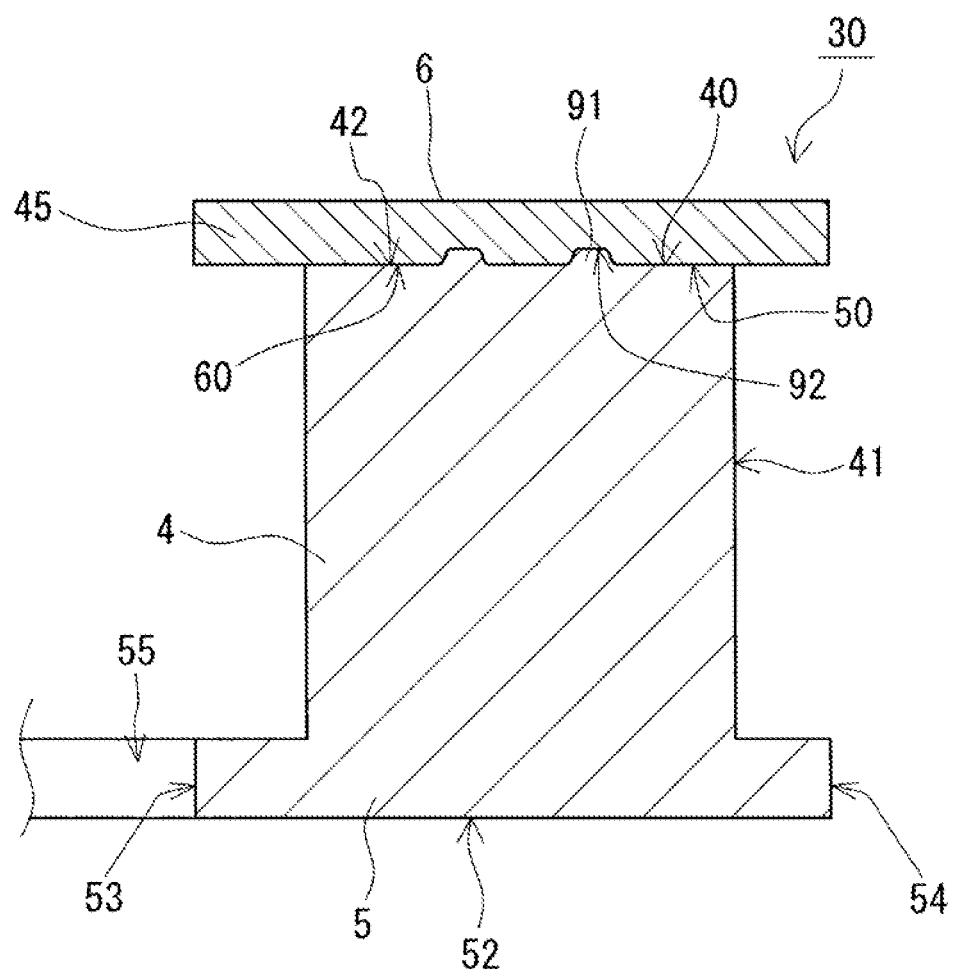
FIG. 15 is a fragmentary sectional view describing the coupling state of a tooth and a plate-shaped piece of a rotating electrical machine according to a sixth embodiment.

In a sixth embodiment, a core 30 that differs from the core 30 in the fifth embodiment is described with reference to FIG. 15, as a configuration including a plate-shaped piece 6 that is disposed on the side of a tooth 4 opposite to a yoke 5.

In this example, a first coupling portion 91 constituted by a ring-shaped protrusion is formed at a first surface 40 of the tooth 4. Moreover, a second coupling portion 92 constituted by a ring-shaped recess is formed in a second surface 50 of the plate-shaped piece 6. Even with the configuration in this example, a flange portion 45 can be formed at the tooth 4 after the coil 31 (FIG. 10) is disposed at the tooth 4.

Seventh Embodiment

The core 30 according to any one of the first to sixth embodiments is used for a stator. The core may be used for a rotor.

REFERENCE SIGNS LIST 1 rotating electrical machine
  10 housing
2 rotor
  20 shaft, 21 holding plate, 22 magnet, 23 bearing
3 stator
  23 core, 31 coil
4 tooth (first member)
  40 first surface, 41 peripheral surface, 42 end surface, 45 flange portion
5 yoke (second member)
  50 second surface, 52 back surface, 53 inner edge surface, 54 outer edge surface, 55 through hole
6 plate-shaped piece (second member)
  60 facing surface
9 coupling mechanism
  91 first coupling portion, 92 second coupling portion, 93 third coupling portion, 94 fourth coupling portion
  9d bottom surface, 9i inner wall surface, 9o outer wall surface, 9t top surface

The invention claimed is:

1. A core included in a rotor or a stator of an axial-gap rotating electrical machine, wherein
the core includes a block-shaped first member and a plate-shaped second member that are constituted by powder compacts,
the first member includes a first surface that faces the second member, and a first coupling portion that is formed at the first surface,
the second member includes a second surface that faces the first surface, and a second coupling portion that is formed at the second surface and that is coupled to the first coupling portion,
one of the first coupling portion and the second coupling portion is constituted by a protrusion, and the other one is constituted by a recess having a shape corresponding to the protrusion, and
a front shape of the first coupling portion when seen in a direction orthogonal to the first surface and a front shape of the second coupling portion when seen in a direction orthogonal to the second surface are ring shapes or discontinuous ring shapes that are partly discontinuous;
wherein the ring shapes of the first and second coupling portions are defined by inner and outer annular or discontinuous annular lines that outline the protrusion of the one of the first and second coupling portions and the recess of the other of the first and second coupling portions.

2. The core according to claim 1, wherein
the first member is a tooth, and
the second member is a yoke.

3. The core according to claim 1, wherein
the first member is a tooth having a flange portion, and
the second member is a yoke.

4. The core according to claim 1, wherein
the first member is an integral object of a tooth and a yoke,
the second member is a plate-shaped piece that is provided separately from the yoke, and
the plate-shaped piece is disposed on an end surface of the tooth on a side opposite to the yoke and includes a flange portion that protrudes from an outline of the end surface.

5. The core according to claim 1, wherein
the first member is a tooth, and
the second member is a yoke and a plate-shaped piece that is provided separately from the yoke, and
the plate-shaped piece is disposed on an end surface of the tooth on a side opposite to the yoke and includes a flange portion that protrudes from an outline of the end surface.

6. The core according to claim 1, wherein the front shape of the first coupling portion and the front shape of the second coupling portion are non-circular-ring shapes.

7. The core according to claim 1, wherein
a joint between a bottom surface and an inner wall surface of the recess and a joint between the inner wall surface and the first surface or the second surface of the recess are rounded, and
a joint between a top surface and an outer wall surface of the protrusion and a joint between the outer wall surface and the first surface or the second surface of the protrusion are rounded.

8. The core according to claim 1, wherein a depth of the recess and a height of the protrusion are 0.5 mm or more and 30% or less of a thickness of one of the first member and the second member having a smaller thickness.

9. The core according to claim 1, wherein a width of the recess and a width of the protrusion are 0.5 mm or more and 10 mm or less.

10. The core according to claim 1, wherein
a joint between a bottom surface and an inner wall surface of the recess and a joint between the inner wall surface and the first surface or the second surface of the recess are rounded,
a joint between a top surface and an outer wall surface of the protrusion and a joint between the outer wall surface and the first surface or the second surface of the protrusion are rounded, and
a radius of curvature of roundness of each of the joints is 0.5 mm or more and 4.0 mm or less.

11. The core according to claim 1, wherein the first coupling portion is a recess, and the second coupling portion is a protrusion.

12. The core according to claim 1, wherein the first coupling portion is a protrusion, and the second coupling portion is a recess.

13. The core according to claim 1, wherein the front shape of the first coupling portion and the front shape of the second coupling portion each are a racetrack shape or any shape selected from a triangle, a rectangle, a trapezoid, and a rhombus whose vertices are rounded.

14. The core according to claim 1, wherein
when an area of the first surface is 100%, an area on an inner side with respect to an outline of an outer periphery of the first coupling portion is 10% or more and 80% or less, and
when an area of the second surface that corresponds to an outline of the first surface to which the second surface faces is 100%, an area on an inner side with respect to an outline of an outer periphery of the second coupling portion is 10% or more and 80% or less.

15. The core according to claim 1, wherein
the first member includes a third coupling portion that is formed on an inner side of a ring shape of the first coupling portion at the first surface,
the second member includes a fourth coupling portion that is formed on an inner side of a ring shape of the second coupling portion at the second surface,
the third coupling portion has a shape protruding or recessed on a side opposite to the first coupling portion with respect to the first surface, and
the fourth coupling portion has a shape corresponding to the third coupling portion.

16. A stator comprising:
the core according to claim 1; and
a coil that is disposed at each tooth included in the core.

17. An axial-gap rotating electrical machine in which a rotor and a stator are disposed side by side in an axial direction of a rotating shaft of the rotor, wherein
the stator is the stator according to claim 16.

18. The core according to claim 1, wherein
the inner and outer annular or discontinuous annular lines are inside the first surface or the second surface.

19. The core according to claim 1, wherein
the first member includes a third coupling portion that is formed on an inner side of a ring shape of the first coupling portion at the first surface, and
the third coupling portion has a shape protruding or recessed on a side opposite to the first coupling portion.

20. A core included in a rotor or a stator of an axial-gap rotating electrical machine, wherein
the core includes a block-shaped first member and a plate-shaped second member that are constituted by powder compacts,
the first member includes a first surface that faces the second member, and a first coupling portion that is formed at the first surface,
the second member includes a second surface that faces the first surface, and a second coupling portion that is formed at the second surface and that is coupled to the first coupling portion,
one of the first coupling portion and the second coupling portion is constituted by a protrusion, and the other one is constituted by a recess having a shape corresponding to the protrusion, and
a front shape of the first coupling portion when seen in a direction orthogonal to the first surface and a front shape of the second coupling portion when seen in a direction orthogonal to the second surface are ring shapes or discontinuous ring shapes that are partly discontinuous,
wherein
the first member includes a third coupling portion that is formed on an inner side of a ring shape of the first coupling portion at the first surface,
the second member includes a fourth coupling portion that is formed on an inner side of a ring shape of the second coupling portion at the second surface,
the third coupling portion has a shape protruding or recessed on a side opposite to the first coupling portion with respect to the first surface, and
the fourth coupling portion has a shape corresponding to the third coupling portion.

* * * * *